(12) United States Patent
Lu et al.

(10) Patent No.: US 12,293,206 B2
(45) Date of Patent: May 6, 2025

(54) UPGRADING A VIRTUAL DEVICE DEPLOYMENT BASED ON SPIKE UTILIZATION

(71) Applicant: Microsoft Technology Licensing, LLC, Redmond, WA (US)

(72) Inventors: Hu Lu, Jiangsu (CN); XiWen Yue, Jiangsu (CN); Lingxiao Hang, Jiangsu (CN); Haiyang Wang, Jiangsu (CN); Ankit Srivastava, Redmond, WA (US); Fan Yin, Redmond, WA (US); Naga Venkata Rajagopal Ramadugu, Bothell, WA (US); Nandita Sharma, Redmond, WA (US); Jyh-Han Lin, Mercer Island, WA (US); Sandeep Patnaik, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 619 days.

(21) Appl. No.: 17/543,022

(22) Filed: Dec. 6, 2021

(65) Prior Publication Data

US 2023/0056759 A1    Feb. 23, 2023

Related U.S. Application Data

(60) Provisional application No. 63/235,565, filed on Aug. 20, 2021.

(51) Int. Cl.
*G06F 9/455* (2018.01)
(52) U.S. Cl.
CPC .. *G06F 9/45558* (2013.01); *G06F 2009/4557* (2013.01)

(58) Field of Classification Search
CPC ............... G06F 9/45558; G06F 2009/4557
See application file for complete search history.

(56) References Cited

U.S. PATENT DOCUMENTS 7,908,606 B2 * 3/2011 Depro ................ G06F 11/3409
                                                         705/412
9,124,498 B2    9/2015 Jung et al.
(Continued)

FOREIGN PATENT DOCUMENTS

WO        2013006708 A1      1/2013

OTHER PUBLICATIONS

"International Search Report and Written Opinion Issued in PCT Application No. PCT/US22/038250", Mailed Date: Nov. 7, 2022, 10 Pages.

(Continued)

*Primary Examiner* — Benjamin C Wu
(74) *Attorney, Agent, or Firm* — Ray Quinney & Nebeker; James Bullough

(57) ABSTRACT

The present disclosure relates to systems, methods, and computer-readable media for receiving usage data for a virtual device (or other virtual service), analyzing the usage data to determine a usage bucket characteristic of usage of the virtual device over a period of time, and determining a usage score for the virtual device. The systems described herein further involve causing a deployment of the virtual device to be upgraded, downgraded, or otherwise modified based on the usage bucket and associated usage score. The features and functionalities described herein can provide an efficient mechanism for administrating a tenant deployment as well as implementing a more efficient utilization of cloud computing resources for a variety of virtual services.

20 Claims, 9 Drawing Sheets

(56) References Cited

U.S. PATENT DOCUMENTS

| | | | |
|---|---|---|---|
| 9,411,626 | B2 | 8/2016 | Ghosh et al. |
| 9,722,945 | B2 | 8/2017 | Siciliano et al. |
| 9,858,095 | B2 | 1/2018 | Breitgand et al. |
| 9,880,880 | B2 | 1/2018 | Taylor et al. |
| 9,983,908 | B1 | 5/2018 | Cropper et al. |
| 11,055,126 | B2 | 7/2021 | Khandros et al. |
| 11,886,926 | B1* | 1/2024 | Gadalin ............... G06F 9/4856 |
| 2014/0019964 | A1 | 1/2014 | Neuse et al. |
| 2014/0058871 | A1 | 2/2014 | Marr et al. |
| 2014/0380330 | A1* | 12/2014 | Xiao ..................... G06F 9/5016 718/104 |
| 2015/0052081 | A1 | 2/2015 | Duron et al. |
| 2015/0350108 | A1* | 12/2015 | Baughman ............. H04L 47/83 709/226 |
| 2016/0094401 | A1 | 3/2016 | Anwar et al. |
| 2017/0318083 | A1 | 11/2017 | Ignatyev |
| 2019/0163528 | A1* | 5/2019 | Zhou .................. H04L 67/1004 |
| 2019/0327185 | A1* | 10/2019 | Hassan ............... H04L 43/0876 |
| 2022/0029899 | A1* | 1/2022 | Varnavas ............ H04L 41/0631 |
| 2022/0405138 | A1* | 12/2022 | Prathima ............. G06F 11/323 |
| 2023/0205595 | A1* | 6/2023 | Singh ................. G06F 11/3409 718/104 |
| 2024/0176665 | A1* | 5/2024 | Stanciu .............. G06F 12/0802 |

OTHER PUBLICATIONS

"Dynamic Scaling for Amazon EC2 Auto Scaling", Retrieved From: https://web.archive.org/web/20211020012044/https://docs.aws.amazon.com/autoscaling/ec2/userguide/as-scale-based-on-demand.html, Oct. 20, 2021, 365 Pages.

Boucher, et al., "Best Practices for Autoscale", Retrieved From: https://docs.microsoft.com/en-us/azure/azure-monitor/autoscale/autoscale-best-practices, Jul. 23, 2021, 8 Pages.

Brown, Maxim, "Key Metrics for Amazon EKS Monitoring", Retrieved From: https://web.archive.org/web/20200430025733/https://www.datadoghq.com/blog/eks-cluster-metrics/, Apr. 30, 2020, 14 Pages.

Edprice, "Autoscaling", Retrieved From: https://docs.microsoft.com/en-us/azure/architecture/best-practices/auto-scaling, Nov. 12, 2021, 9 Pages.

Finn, Aidan, "Automatically Resize an Azure VM", Retrieved From: https://petri.com/automatically-resize-azure-vm, Dec. 17, 2017, 17 Pages.

Ohlinger, et al., "Checklist: Measuring Performance on Hyper-V", Retrieved From: https://docs.microsoft.com/en-us/biztalk/technical-guides/checklist-measuring-performance-on-hyper-v, Feb. 2, 2021, 11 Pages.

Shyamsundar, et al., "Elastic Pools help you Manage and Scale Multiple Databases in Azure SQL Database", Retrieved from: https://web.archive.org/web/20200718175822/https://docs.microsoft.com/en-us/azure/azure-sql/database/elastic-pool-overview, Apr. 9, 2020, 12 Pages.

Wren, et al., "Overview of Autoscale with Azure Virtual Machine Scale Sets", Retrieved From: https://docs.microsoft.com/en-us/azure/virtual-machine-scale-sets/virtual-machine-scale-sets-autoscale-overview, Sep. 23, 2021, 7 Pages.

* cited by examiner

UPGRADING A VIRTUAL DEVICE DEPLOYMENT BASED ON SPIKE UTILIZATION

CROSS-REFERENCE TO RELATED APPLICATIONS

This application claims the benefit of and priority to U.S. Provisional Application No. 63/235,565 filed Aug. 20, 2021, the entirety of which is incorporated herein by reference.

BACKGROUND

Recent years have seen a precipitous rise in the use of computing devices (e.g., mobile devices, personal computers, server devices) to implement a variety of applications and tasks. For example, many individuals and businesses have begun using cloud computing resources to run a wide variety of applications and tasks. Indeed, in an effort to leverage increased computing, storage, and memory capacity that the cloud provides, many businesses are transitioning from utilization of expensive local machines and services to virtual machines that are deployed on the cloud.

As demand for cloud computing resources (e.g., storage resources, memory resources, computing resources) continues to grow in size and complexity, cloud computing systems have grown in size and complexity to meet the demand. Nevertheless, because different tenants and individual users have different individual demands, providing sufficient resources in an efficient way poses significant challenges. For example, as a result of some individuals being associated with light or infrequent usage of cloud computing resources, many deployments have an overallocation of computing resources, which consumes significant power and unused storage capacity. This unused allocation of computing resources results in higher computing costs for both cloud providers and tenants alike. Conversely, other individuals being associated with heavy or frequent usage of cloud computing resources often experience frustration as a result of insufficient resources being allocated on their behalf. Moreover, businesses or tenants having hundreds or thousands of individuals that each have unique usage profiles are often associated with deployments having inefficient allocation of cloud computing resources on their behalf.

These and other problems exist with regard to deploying and scaling deployment of virtual devices and other services on cloud computing systems.

DETAILED DESCRIPTION

Figure 1:
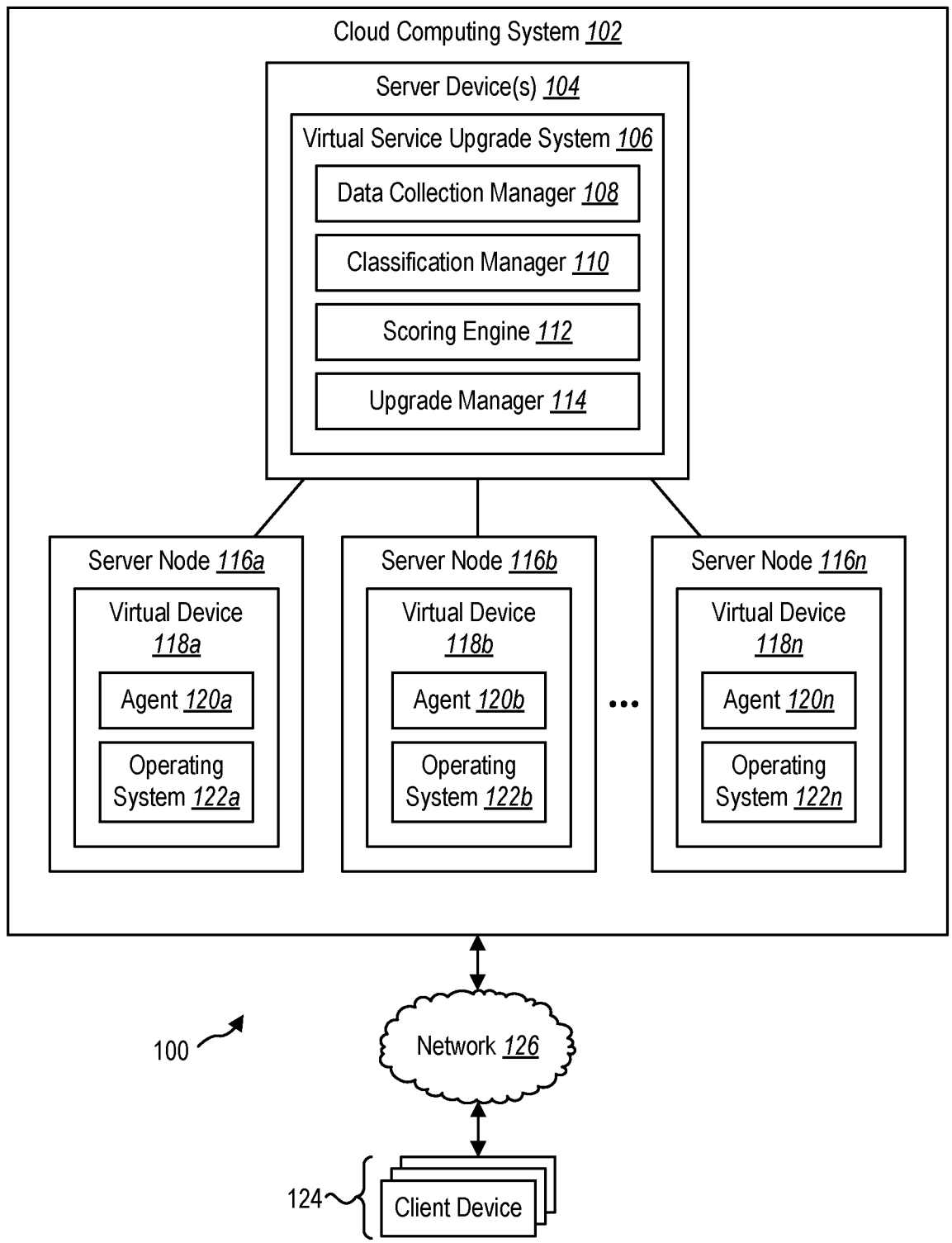
FIG. 1 illustrates an example environment including a virtual service upgrade system in accordance with one or more embodiments.

The present disclosure relates to a virtual service upgrade system that is configured to collect or otherwise receive usage data for a virtual device (or other virtual services), evaluate unique characteristics of the usage data, and determine a current usage score that provides actionable information to facilitate an upgrade (or downgrade) of the virtual device. In particular, as will be discussed in further detail below, the virtual service upgrade system can employ agents on virtual devices to collect usage data over a plurality of time intervals (e.g., one second, five seconds, ten seconds, etc.) that span a predetermined period of time (e.g., two weeks). The virtual service upgrade system may additionally classify the virtual device within a respective bucket or category and determine, based on the classification, a current usage score reflective of how heavy or light the virtual device has been used over a recent period of time.

This determination may be used to implement or otherwise initiate an upgrade or downgrade of the virtual device to a virtual device having a different set of resource specifications. As will be discussed below, this upgrade/downgrade may be performed dynamically without losing data or otherwise interrupting services provided to a user via the virtual device(s). Indeed, in one or more embodiments, the upgrade or downgrade of the virtual device may be performed in a manner that is agnostic or otherwise non-transparent to an end-user.

As an illustrative example, and in accordance with one or more embodiments, the virtual service upgrade system may receive usage data of a virtual device that has been sampled or otherwise obtained by an agent on the virtual device. The virtual service upgrade system may aggregate the data, determine various usage metrics, and classify the virtual device within a usage bucket associated with a range of usage scores. In one or more embodiments, the virtual service upgrade system classifies the virtual device by determining a spike metric based on a number of time intervals (e.g., zero, one, or a number of multiple time intervals) that the usage data exceeds a threshold value over a predetermined period of time. The virtual service upgrade system may further classify the virtual device by determining a usage bucket associated with a range of usage scores. The virtual service upgrade system can additionally generate a current usage score for the predetermined period of time based in part on the assigned bucket. In one or more embodiments, the virtual service upgrade system can cause the virtual device to be upgraded based on the current usage score being less than the threshold usage score for the predetermined period of time.

The present disclosure includes a number of practical applications that provide benefits and/or solve problems associated evaluating usage of virtual devices and deploying virtual device (and other virtual services) in an efficient manner. Examples of some of these benefits are discussed in further detail below.

For example, in one or more embodiments described herein, a virtual service upgrade system provides flexibility in deployment of a virtual device that enables modification of the virtual device after deployment and based on observed changes and trends in how the virtual device is used over time. This can be particularly helpful for a deployment that involves hundreds or thousands of individual virtual devices that are associated with individuals of an organization having unique usage profiles across a user-base. For example, the virtual service upgrade system may facilitate deployment of a virtual device associated with a first virtual machine type (e.g., a first VM family, VM stock keeping unit (SKU)) on the cloud for a first individual associated with heavy usage of the virtual device. The virtual service upgrade system may alternatively deploy a virtual device associated with a second virtual machine type on the cloud for a second individual associated with light or infrequent usage of the virtual device. These deployments may be implemented in a dynamic way in which virtual devices are modified (e.g., upgraded and/or downgraded) on the fly based on a current usage profile.

In addition to providing a dynamic and flexible solution to virtual machines having different usage profiles, the virtual service upgrade system can further provide a more efficient utilization of cloud computing resources over conventional deployments. For example, by dynamically upgrading and/or downgrading virtual devices for various users of a multi-user tenant deployment, the virtual service upgrade system can reduce power consumption caused by overallocation of cloud computing resources to individuals and organizations that are not using the peak capacity of cloud computing resources. As noted above, this can significantly reduce power consumption at datacenters of the cloud and further free up significant cloud-computing resources for other deployments. This can also provide capacity on a datacenter to accommodate sudden or gradual increases of resource usage by one or more tenants.

In addition to expanding flexibility and elasticity of cloud computing resources generally, features and functionalities of the virtual service upgrade system described herein can collect and/or analyze usage data in a computationally efficient manner relative to other data collection and analytics systems. For example, where conventional systems will typically collect massive quantities of data for each and every computing device from a large grouping of devices, systems described herein provide an intelligent approach to selectively analyzing usage data and determining usage scores for a subset of devices that are behaving in a particular manner. For instance, the virtual service upgrade system can selectively analyze usage data and usage scores for a fraction of devices of a deployment based on the fraction of devices being used above a minimum threshold. Further, even where a particular device that satisfies a minimum usage threshold is identified as a machine of interest, the virtual service upgrade system may nonetheless quantify the usage profile in terms of a number of intervals that the device satisfies one or more usage thresholds.

As a more specific example, and as will be discussed in further detail herein, the virtual service upgrade system can further provide the usage score without analyzing each and every bit of usage data. For example, in one or more embodiments, the virtual service upgrade system may determine various metrics and a corresponding usage score based on counts of time intervals that certain conditions are observed by an agent on the virtual device. This incremental approach enables the virtual service upgrade system to discard data associated with non-active time intervals. This unique approach also enables the virtual service upgrade system to determine and provide actionable intelligence without expensing significant storage, memory, and processing resources of an administrative system (e.g., a local and/or cloud-based system). This approach further enables the virtual service upgrade system to determine and update a current usage score at frequent intervals to provide an up-to-date and current profile of resource utilization for any number of virtual devices Each of the above benefits may significantly reduce costs for both cloud computing providers and tenants. For example, by modifying deployment of virtual devices based on disparate usage profiles, a tenant can save significant costs by downgrading a subscription for one or more of the individuals on the tenant account. Moreover, by downgrading and/or upgrading virtual devices to align with the unique usage profiles of individuals, a cloud computing provider can reduce costs associated with delivering power to higher capacity server nodes that represent an overallocation of cloud-computing resources for a particular individual. For example, the virtual service upgrade system enables cloud computing providers to prevent loss of value as a result of unused compute cores being overallocated and losing value over time. Moreover, by collecting and analyzing the usage data in an intelligent manner, the virtual service upgrade system provides the above services without expending significant resources that would be required to analyze usage data for each and every device over long periods of time.

As will be discussed in further detail below, the virtual service upgrade system can additionally provide actionable intelligence to an administrator of a deployment to enable the administrator to upgrade and/or downgrade deployments based on the usage scores determined herein. For example, as will be discussed herein, a virtual service upgrade system can determine a current usage score representative of CPU usage, memory usage, I/O usage, or other resource metric(s) over a predetermined period of time and provide an indication of one or more virtual devices that can be analyzed in further depth before making an upgrade or downgrade decision. As will be discussed in further detail below, this usage score may be based on a combination of spike usage and usage time.

As illustrated in the foregoing discussion, the present disclosure utilizes a variety of terms to described features and advantages of the virtual service upgrade system. Additional detail will now be provided regarding the meaning of some of these terms.

For example, as used herein, a "cloud computing system" refers to a network of connected computing devices that provide various services to customer devices (e.g., client devices, network devices). For instance, a distributed computing system can include a collection of physical server devices (e.g., server nodes) organized in a hierarchical structure including clusters, computing zones, virtual local area networks (VLANs), racks, fault domains, etc. The cloud computing system may refer to a private or public cloud computing system.

As used herein, a "virtual device" refers to an emulation of a computer system on a server node that provides functionality of one or more applications on a cloud computing system. In one or more embodiments, a virtual device refers to an emulation of a computing device associated with an individual account or individual user. A virtual device may refer to one of a plurality of virtual devices or other services of a tenant deployment. It will be understood that while one or more specific examples and implementations described herein relate specifically to virtual devices, features and functionality described in connection with a virtual device may similarly refer to other types of virtual machines or computing containers configured to provide functionality of a wide variety of cloud-computing applications.

As used herein, "usage data" or "utilization data" may refer interchangeably to any information associated with utilization of cloud computing resources on a cloud computing system. For example, usage data may refer to utilization of memory resources, processing resources, and/or input/output (I/O) resources on one or more server nodes. In one or more embodiments, the usage data refers specifically to utilization of one or more cloud computing resources for a particular virtual device. In one or more embodiments described herein, usage data may refer to telemetry sampled, captured, or otherwise obtained by an agent of a virtual device that has been configured to sample usage data at periodic intervals of time. For example, usage data may refer to sampled snapshots showing utilization of various cloud computing resources at periodic points in time. Usage data may refer to raw data and/or refined or extrapolated data that provides a description or state of resource utilization for a relevant period of time.

As used herein, a "usage score" may refer to a value associated with a virtual device based on usage data. As will be discussed in further detail below, a usage score may be determined based on various usage metrics that are calculated from the usage data over some period of time (e.g., two weeks). By way of example, a usage score may be determined based on a spike level metric associated with a ratio of resource usage and resource capacity. In one or more embodiments, a usage score is determined based on a time usage metric associated with a frequency of usage over a period of time.

In one or more embodiments described herein, usage data may be obtained over a plurality of time intervals and over some predetermined period of time. As used herein, a "time interval" refers to a period of time over which usage data is collected or sampled for a virtual device. For example, a time interval may refer to a one second interval, five second interval, ten second interval, or other relatively brief duration of time for which one or multiple types of usage data are obtained. In one or more embodiments, a time interval refers to a sampling interval where an agent on a virtual device samples or accumulates data for a time interval. For example, where a time interval refers to a ten second duration of time, an agent may capture a state of one or more usage data types for the ten second interval or, in some instances, may accumulate data captured at more granular moment over the ten second interval.

As used herein, a "predetermined period of time" may refer any length of time that includes a plurality of time intervals. For example, in one or more embodiments described herein, a predetermined period of time may refer to a day, a week, two weeks, a month or other duration of time. As will be discussed in further detail below, usage data collected, received, or otherwise obtained for a plurality of time intervals may be accumulated for a predetermined period of time, such as a preceding two week period from a time where a spike level metric (or other usage metric) is calculated for the virtual device.

Additional detail will now be provided regarding a virtual service upgrade system in relation to illustrative figures portraying example implementations. For example, FIG. 1 illustrates an example environment showing an example implementation of the virtual service upgrade system on a cloud computing system. As shown in FIG. 1, the environment 100 includes a cloud computing system 102 having at least one device thereon. For example, the cloud computing system 102 may include one or more server device(s) 104 having the virtual service upgrade system 106 implemented thereon. The virtual service upgrade system 106 may include a data collection manager 108, classification manager 110, scoring engine 112, and an upgrade manager 114. Additional information in connection with these components will be discussed below.

In addition to the server device(s) 104, the cloud computing system 102 may include any number of server nodes 116*a-n* thereon. As shown in FIG. 1, the server nodes 116*a-n* may include virtual devices 118*a-n* (or other virtual machines) deployed thereon. Each of the virtual devices 118*a-n* may include agent(s) 120*a-n* and an operating system (OS) 122*a-n*. For example, as illustrated in FIG. 1, the cloud computing system 102 may include a first server node 116*a* hosting a first one or more virtual device(s) 118*a*. As further shown, the cloud computing system 102 may include additional server nodes 116*b-n*, each hosting one or more virtual device(s) 118*b-n* thereon.

As shown in FIG. 1, the environment 100 may include a plurality of client devices 124 in communication with the cloud computing system 102 (e.g., in communication with different server nodes) via a network 126. The client devices 124 may refer to various types of computing devices including, by way of example, mobile devices, desktop computers, server devices, or other types of computing devices. The network 126 may include one or more networks that use one or more communication platforms or technologies for transmitting data. For example, the network 126 may include the Internet or other data link that enables transport of electronic data between respective client devices 124 and devices of the cloud computing system 102.

As shown in FIG. 1 and as will be discussed in further detail herein, the virtual service upgrade system 106 may components that provide various features and functionalities described herein. While FIG. 1 illustrates an example in which each of the components of the virtual service upgrade system 106 are implemented on a single server device, it will be understood that one or more of the respective components may be implemented on additional server devices. Moreover, it will be understood that discrete features and functionalities described herein with respect to one or more of the respective components may similarly be implemented on the same or across multiple server devices. Further, while one or more features described herein may be discussed in connection with a specific component, it will be understood that the features and functionalities described in connection with a specific component does not preclude that feature or functionality being performed by a different component of the virtual service upgrade system 106.

Figure 2:
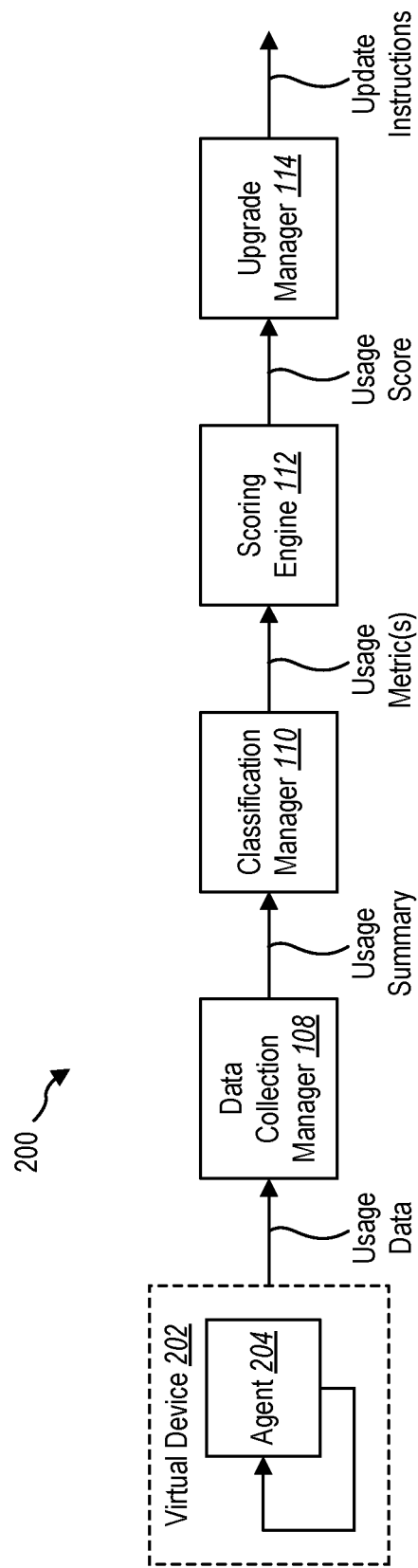
FIG. 2 illustrates an example workflow in which a virtual service upgrade system collects and evaluates usage data for a virtual device in accordance with one or more embodiments.

FIG. 2 illustrates an example workflow 200 showing an example implementation of the virtual service upgrade system 106 in accordance with one or more embodiments herein. In particular, FIG. 2 shows a workflow 200 including an agent 204 on an example virtual device 202 and components of the virtual service upgrade system 106 in connection with collecting usage data, analyzing the usage data to generate a usage score, and generating update instructions for a virtual device 202 in accordance with one or more embodiments. A similar workflow may be applied to any number of virtual devices, such as a collection of hundreds or thousands of virtual devices associated with a particular organization (e.g., a tenant deployment).

As shown in FIG. 2, an agent 204 of a virtual device 202 may sample usage data for the virtual device 202. In one or more embodiments, the agent 204 samples the usage data at regular intervals. For example, the agent 204 may refer to a software agent that is configured to sample usage data for the virtual device 202 at fixed intervals every few seconds. In one or more embodiments, the agent 204 is configured to sample usage data every ten seconds (or other fixed interval of time).

The agent 204 may be configured to sample different types of usage data in accordance with one or more embodiments. For example, in one or more embodiments, the agent 204 samples CPU data indicating a metric of processing usage at regular time intervals. As another example, in one or more embodiments, the agent 204 samples memory data indicating a quantity of memory in use by the virtual device 202 at regular time intervals. As another example, the agent 204 may sample an I/O metric indicating an I/O rate for the virtual device 202 at regular time intervals. In one or more embodiments, the agent 204 captures or otherwise samples usage data including a combination of different types of usage data.

As shown in FIG. 2, the agent 204 can provide the usage data to a data collection manager 108 for further processing. Upon receiving the usage data, the data collection manager 108 may process the usage data in a variety of ways. For example, in one or more embodiments, the data collection manager 108 can aggregate or compile the usage data for various time intervals that are larger than the sample time interval of the agent 204. In this way, the data collection manager 108 can generate interval snapshots and/or summaries of the usage data that provides useful data over various periods of time. For instance, in one or more embodiments, the data collection manager 108 aggregates data that has been sampled at ten second intervals into fifteen minute summaries. In one or more embodiments, the data collection manager 108 generates hourly, daily, and/or weekly summaries that further provide a picture of utilization for the virtual device(s) 102.

As shown in FIG. 2, the data collection manager 108 can provide usage summary data to the classification manager 110 for further processing. In particular, as will be discussed in further detail below, the classification manager 110 can process the received usage data (e.g., the usage summary data) to determine various usage metrics. These usage metrics can provide usage characteristics for how the virtual device(s) 202 is used over time.

As noted above, the classification manager 110 can determine a variety of usage metrics associated with different usage characteristics of a virtual device 202. For example, in one or more embodiments, the classification manager 110 may determine a spike level metric for a virtual device 202. As used herein, a spike level metric may refer to a usage profile in which a virtual device 202 utilizes more than a threshold measure of cloud computing resources over a time interval. For example, in one or more embodiments, a virtual device 202 may have a spike level metric indicating that a virtual device 202 utilized more than 75% of one or more cloud computing resources for a relevant time period.

Other implementations may include different (or additional) threshold percentages. For example, in one or more embodiments, the classification manager 110 may determine a first spike level metric indicating whether the virtual device 202 used more than 50%, 75%, and/or 90% of cloud computing resources over a particular time interval. In one or more embodiments, the classification manager 110 determines spike metrics associated with different percentages and/or thresholds based on unique applications that the virtual device 202 is configured to run. Moreover, as noted above, the classification manager 110 may determine a spike level metric for each of a variety of types of usage data (e.g., usage data corresponding to different types of cloud computing resources).

As noted above, the classification manager 110 may receive usage summary data including information associated with different time intervals. In one or more embodiments, the classification manager 110 may determine the spike level metric (or other usage metric) for a time interval over which the data collection manager 108 has aggregated data samples obtained over the time interval. As an illustrative example, the classification manager 108 may determine a spike level metric for each time interval (e.g., every fifteen minute interval) indicating that the virtual device 202 consumed at least a threshold quantity of cloud computing resources (e.g., on average) over the specific time interval.

In addition to the spike level metric, in one or more embodiments, the classification manager 110 can determine a time usage metric for the virtual device 202. As used herein, a time usage metric may refer to a usage profile in which a virtual device 202 utilizes a minimum threshold of cloud computing resources over a time interval. For example, in one or more embodiments, a virtual device 202 may have a time usage metric indicating that the virtual device 202 utilizes a non-zero quantity of cloud computing resources for a relevant time period (e.g., beyond simply running an OS or other base-level applications).

Similar to the spike level metric, the classification manager 110 may determine the time usage metric for each of multiple time intervals. For example, the classification manager 110 may simply determine a binary one (1) or zero (0) for each fifteen minute time interval. In one or more embodiments, the classification manager 110 may determine a more specific usage metric indicating any number of sample intervals (e.g., corresponding to a rate that the agent samples the usage data) for which cloud computing resources are being utilized by a user of the virtual device 202.

In one or more embodiments, the classification manager 110 may implement a workflow in which the time usage metric and spike level metric are determined as part of a combined process. For example, in one or more embodiments, the classification manager 110 may first determine whether a time usage metric indicates that a virtual device 202 has been used more than a minimal amount (e.g., a non-zero quantity or other minimal quantity of usage) over a relevant time interval. Where the time usage metric indicates that the virtual device 202 has not been used over the time interval, the classification manager 110 may automatically determine that the spike level metric is also zero for the same time period. Alternatively, where the time usage metric indicates that the virtual device 202 has been used some amount during the relevant time interval, the classification manager 110 may proceed to determine the spike level metric for the time interval. Additional information in connection with this process will be discussed below in connection with FIG. 3B.

As noted above, the classification manager 110 can determine usage metrics for each time interval over a predetermined period of time. For example, in one or more embodiments, the classification manager 110 may determine usage metrics for fifteen second time intervals (or other time interval lengths) over multiple days and/or multiple weeks. In one or more implementations described herein, the classification manager 110 determines usage metrics over a two week period.

As shown in FIG. 2, the classification manager 110 may provide the usage metric data to a scoring engine 112 for further processing. Upon receiving the usage metric(s), the scoring engine 112 may determine a usage score for the virtual device 202 based at least on the spike level metric and one or more additional usage metrics (e.g., a time usage metric). As will be discussed in further detail below, the scoring engine 112 may determine a usage score for a virtual device 202 over a predetermined period of time in a variety of ways.

For example, in one or more embodiments, the scoring engine 112 may assign or otherwise associate a virtual device 202 to a usage bucket based on one or more usage metrics. As used herein, a usage bucket may refer to a category or classification of usage corresponding to a level of usage for a given virtual device. By way of example, the scoring engine 112 may associate the virtual device 202 with one of a plurality of usage buckets associated with incremental levels of usage (e.g., high usage, medium usage, low usage). As will be discussed in one or more embodiments herein, the scoring engine may assign a virtual device 202 to a specific usage bucket from any number of possible usage buckets corresponding to different levels of usage.

In one or more embodiments, the scoring engine 112 assigns a virtual device 202 to a corresponding usage bucket based on a combination of the spike level metric and the time usage metric. For example, the scoring engine 112 may provide a spike usage metric for a predetermined period of time and a time usage metric for the predetermined period of time as inputs to a model that is trained to classify or otherwise categorize the combined usage metrics within a corresponding usage bucket.

In one or more embodiments, the scoring engine 112 determines the usage bucket based on a piecewise linear model in which the spike level metric and/or the time usage metric are assigned a corresponding value based on discrete ranges of the usage metrics provided by the classification manager 110. By way of example, the scoring engine 112 may determine a first, second, or third spike usage metric based on a comparison of a number of time intervals (e.g., zero, one, or multiple time intervals) that the virtual device exceeds a threshold value (e.g., where a usage summary for a corresponding time interval indicates a level of resource use above a spike threshold). As another example, the scoring engine 112 may determine a first, second, or third time usage metric based on a comparison of a number of time intervals that the virtual device 202 is used for any amount of time (e.g., a non-zero amount of time or greater than some minimum threshold value).

By way of example and not limitation, the scoring engine 112 may implement a piecewise linear model based on the following equations in which the spike level is determined in accordance with the following thresholds:

$$SpikeLevel(x) = \begin{cases} L & x < 10 \\ M & 10 \leq x < 25 \\ H & x \geq 25 \end{cases}$$

Where "x" refers to a percentage of time intervals that a threshold resource utilization is satisfied. As explanation for the above equation, the scoring engine 112 may determine that where a virtual device 202 is consumes cloud computing resources at above a threshold level for less than 10% of the time intervals (e.g., 15 minute increments) over a predetermined period of time (e.g., 2 weeks), the scoring engine 112 may calculate a "Low" score or classification for the virtual device 202 for the predetermined time period. Along similar lines, the scoring engine 112 may assign a "Medium" score or classification where the virtual device 202 is found to consume cloud computing resources between 10% and 25% of the time intervals over the predetermined period of time. The scoring engine 112 may assign a "High" score or classification where the virtual device 202 is found to consume cloud computing resources 25% or more of the time intervals over the predetermined period of time.

Similarly, the scoring engine 112 may determine a corresponding time usage metric in accordance with the following thresholds:

$$UsageLevel(x) = \begin{cases} L & x < 120 \\ M & 120 \leq x < 600 \\ H & x \geq 600 \end{cases}$$

In which "x" refers to a number of minutes that the virtual device is found to be used above a minimum threshold (independent of whether the spike usage threshold is satisfied. As explanation for the above equation, the scoring engine 112 may assign a "Low" score or classification where the virtual device is found to be in use for fewer than 120 total minutes over the predetermined period of time (e.g., two weeks). The scoring engine may assign a "Medium" score or classification where the virtual device is found to be in use between 120 and 600 total minutes over the predetermined period of time. The scoring engine 112 may assign a "High" score or classification where the virtual device 202 is found to be in use at or over 600 total minutes over the predetermined period of time.

It will be understood that other implementations may include different thresholds for the respective usage metrics. In addition, other implementations may incorporate different predetermined periods of time and/or different time intervals in determining the respective usage metric values.

As will be discussed in further detail below, each of the usage buckets may have corresponding ranges of values. To illustrate, in the example discussed above in which the assigns a virtual device into one of eight different categories (e.g., ranging from x=0 to x=8), the ranges of values may be as follows:

$$FloorBucket(x) = \begin{cases} 0 & x = 0 \\ 20 & x = 1 \\ 30 & x = 2 \\ 40 & x = 3 \\ 50 & x = 4 \\ 60 & x = 5 \\ 70 & x = 6 \\ 80 & x = 7 \\ 90 & x = 8 \end{cases}$$

$$CeilBucket(x) = \begin{cases} 20 & x = 0 \\ 30 & x = 1 \\ 40 & x = 2 \\ 50 & x = 3 \\ 60 & x = 4 \\ 70 & x = 5 \\ 80 & x = 6 \\ 90 & x = 7 \\ 100 & x = 8 \end{cases}$$

It will be understood that other implementations may have different ranges of values. Moreover, additional detail in connection with one or more embodiments will be discussed below in connection with FIG. 4.

As noted above, the scoring engine 112 may assign a virtual device 202 to one of a plurality of usage buckets based on one or more of the usage metrics. For example, in one or more embodiments, the scoring engine 112 assigns the virtual device 202 to a corresponding usage bucket based on the determined scores or classifications that are assigned to the virtual device 202 in accordance with the piecewise linear functions described above. As a non-limiting example that considers spike level metric and time usage metric, the scoring engine 112 may assign a virtual device to one of eight categories based on the combination of respective metrics. The classification within the respective usage buckets may be determined as follows:

$$Bucket(x, y) = \begin{cases} 8 & x = L, y = L \\ 7 & x = L, y = M \\ 6 & x = L, y = H \\ 5 & x = M, y = L \\ 4 & x = M, y = M \\ 3 & x = M, y = H \\ 2 & x = H, y = L \\ 1 & x = H, y = M \\ 0 & x = H, y = H \end{cases}$$

In which "x" refers to a low, medium, or high classification based on a spike level metric and "y" refers to a low, medium, or high classification based on a time usage metric.

In addition to determining the spike usage metric(s), the scoring engine 112 may determine the upper and lower limit functions for the respective usage metrics. For example, a spike usage ceiling may be determined using the following equation:

$$CeilSpike(x) = \begin{cases} 10 & x < 10 \\ 25 & 10 \le x < 25 \\ 100 & x \ge 25 \end{cases}$$

Conversely, a spike usage floor may be determined using the following equation:

$$FloorSpike(x) = \begin{cases} 0 & x < 10 \\ 10 & 10 \le x < 25 \\ 25 & x \ge 25 \end{cases}$$

Each of the above formulas may be used to calculate the lower limit and upper limit of the spike percent level, respectively. Additional detail will be discussed below in connection with FIG. 4.

Along similar lines, a time usage ceiling may be determined using the following equation:

$$CeilUsage(x) = \begin{cases} 120 & x < 120 \\ 600 & 120 \le x < 600 \\ x & x \ge 600 \end{cases}$$

Conversely, a time usage floor may be determined using the following equation:

$$FloorUsage(x) = \begin{cases} 0 & x < 120 \\ 120 & 120 \le x < 600 \\ 600 & x \ge 600 \end{cases}$$

Each of the above formulas may be used to calculate the lower limit and upper limit of the time usage levels, respectively. Additional detail will be discussed below in connection with FIG. 4.

Upon determining the various bucket limits and classifying a virtual device within one of the plurality of usage buckets, the scoring engine 112 may perform a score adjustment to determine a more precise usage score. This adjusted score may be determined based on a score interval for an identified usage bucket. In addition, the scoring engine 112 may consider some of the more granular usage data aggregated by the data collection manager 108 to determine a more specific value within the bucket value ranges. By way of example, the scoring engine 112 may use the following formulas:

$$score = b - \frac{b-a}{2} \times \left[ \frac{x - FloorSpike(x)}{CeilSpike(x) - FloorSpike(x)} + \frac{y - FloorUsage(y)}{CeilUsage(y) - FloorUsage(y)} \right]$$

$$b = CeilBucket(Bucket(SpikeLevel(x), UsageLevel(y)))$$

$$a = FloorBucket(Bucket(SpikeLevel(x), UsageLevel(y)))$$

in which "a" and "b" represent the upper and lower limits of the assigned bucket, "x" refers to specific spike usage metric values for the predetermined period of time, and "y" refers to specific time usage metric values for the predetermined period of time.

As shown in FIG. 2, the scoring engine 112 may output a usage score based on one or more of the spike usage metric, time usage metric, and associated usage bucket to which the virtual device 202 has been assigned. In accordance with one or more embodiments described herein, the scoring engine 112 may output a higher score for a healthier virtual device that is not approaching peak usage capacity (e.g., representing low or medium usage). Conversely, the scoring engine 112 may output a lower score for a less healthy virtual device that is approaching peak usage capacity (e.g., representing medium or high usage). As shown in FIG. 2, the scoring engine 112 may provide a current usage score to the upgrade manager 114 for further processing.

As used herein, a current usage score may include a usage score determined based on an assigned usage bucket and/or various usage metrics for a recent period of time dating back to a beginning of a predetermined period of time. Thus, where the predetermined period of time refers to a two week period of time, the current usage score may refer to a most recent two week period. It will be understood that the scoring engine 112 may dynamically update the usage score over time as additional usage data is sampled, aggregated, and further analyzed to determine an updated usage score.

As shown in FIG. 2, the upgrade manager 114 may generate update instructions based on the received usage score. For example, the upgrade manager 114 may generate instructions to upgrade a virtual device 202 where the usage score is less than a threshold usage score indicating that the virtual device 202 is operating at near peak capacity. In one or more embodiments, the upgrade manager 114 may determine to upgrade the virtual device 202 based on the usage score being less than a threshold usage score for some predefined period of time. Conversely, where the usage score is at or above a threshold value, the upgrade manager 114 may take no further action with regard to upgrading the virtual device 202.

While one or more embodiments described herein involve causing a virtual device 202 to initiate an upgrade process, in one or more embodiments, the upgrade manager 114 may determine that the virtual device 202 should be downgraded. For example, where a usage score is higher than a threshold score indicating infrequent or light use of a virtual device 202, the upgrade manager 114 may generate update instructions to downgrade the virtual device 202 to a less expensive version or virtual device type having less cloud computing resources allocated thereto. For example, the upgrade manager 114 may downgrade the virtual device 202 to a version of the virtual device 202 having fewer compute cores, less memory, and/or fewer I/O ports allocated thereto.

Upgrading and/or downgrading a virtual device 202 may refer to a variety of processes. For example, in one or more embodiments, the upgrade manager 114 causes a virtual device of a first type to be upgraded to a virtual device of a second type having a higher quantity of cloud computing resources. For example, the upgrade manager 114 may cause a virtual device having a first set of resource specifications (e.g., memory resources, processing resources) to be upgraded (or downgraded) to a virtual device having a second set of resource specifications. This may involve assigning or otherwise reconfiguring a virtual device to a different family of virtual machines that the cloud computing system (e.g., the cloud computing system 102) is preconfigured to host (e.g., assigning a virtual device having a first discrete or preconfigured set of resource specifications to a different virtual device type having a second discrete or preconfigured set of resource specifications). In one or more embodiments, the upgrade manager 114 simply adds additional memory and/or processors to a deployment for the virtual device 202 (e.g., selectively modifying memory capacity and/or processing capacity for a virtual device).

As used herein, a "device type" may refer to a virtual device having any combination of cloud computing resources associated therewith. For example, a device type may be associated with a specific virtual machine family in which a deployment of a virtual device of the device type is allocated a corresponding quantity of compute resources, memory resources, I/O resources, storage resources, or other cloud computing resources. In one or more embodiments, a cloud computing system may offer a listing of dozens or hundreds of device-types corresponding to different combinations of allocable cloud computing resources that may be provided to a tenant or otherwise included within a deployment of VMs.

In each of the above examples, the upgrade manager 114 may initiate an upgrade, downgrade, or other modification of a virtual device deployment while maintaining data of the virtual device. This may involve a live-migration of data from one virtual device type to another, which may involve migrating data from one server node to another (e.g., on the same or different cluster). In one or more embodiments, this may involve initiating migration of the virtual device during a period in which the virtual device is not being used or during some scheduled update process.

In one or more embodiments, performing the upgrade involves initiating an upgrade or downgrade automatically based on deployment or upgrade policies (e.g., established by an administrator of a tenant deployment). For example, in one or more embodiments, the upgrade manager 114 may cause a virtual device 202 to be upgraded automatically based on the usage score for the virtual device 202 being less than a usage score for some predetermined period of time. Conversely, the upgrade manager 114 may provide an indication to an administrator of a deployment or tenant to allow an administrator to perform additional analysis of the usage data before making a determination about whether to modify the deployment for the virtual device 202. This may serve to limit a number of updates to virtual device deployments as well as allow administrators to have a greater knowledge of a tenant deployment.

Figure 3A:
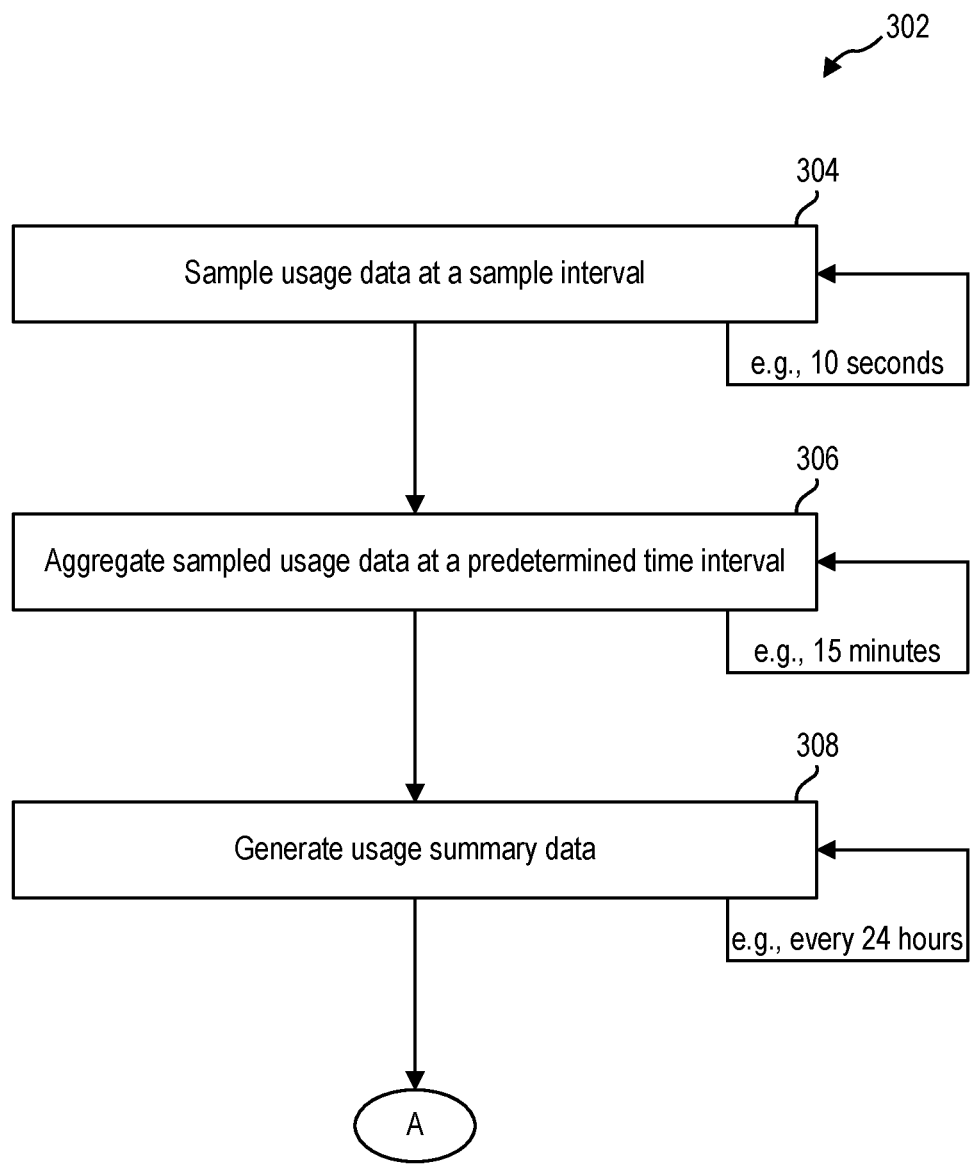
FIG. 3A illustrates an example series of acts related to collecting and aggregating usage data for a virtual device in accordance with one or more embodiments.

Additional detail will now be given with respect to the individual stages of the workflow discussed above in connection with FIG. 2. For example, FIG. 3A illustrates an example series of acts 302 related to sampling and collecting usage data in accordance with one or more embodiments. For example, FIG. 3A illustrates a series of acts 302 including a first act 304 of sampling data at periodic sample intervals. In this example, an agent on a virtual device may be configured to sample usage data every ten seconds. Other implementations may involve sampling data more or less frequently.

As shown in FIG. 3A, the series of acts 302 further includes an act 306 of aggregating sampled usage data at predetermined time intervals (e.g., every 15 minutes). For example, in one or more embodiments, the virtual service upgrade system 106 can aggregate one or more types of usage data sampled by an agent on a virtual device and received over time. The aggregated data may include a summary or average of one or more usage metrics over time, such as a quantity or percentage of cloud computing resources used by the virtual device over a relevant time interval.

As shown in FIG. 3A, the series of acts 302 may further include an act 308 of generating usage summary data over some period of time (e.g., one day, one week, two weeks). The usage summary data may include any information associated with consumption of various cloud computing resources over a relevant period of time. For example, the usage summary data may include an indication or summary of CPU resources, memory resources, I/O resources or any other cloud computing resource expended by the virtual device over an associated period of time. While FIG. 3A shows an example in which the virtual service upgrade system 106 generates a daily usage summary, other implementations may include weekly or bi-weekly summaries associated with a predetermined period of time over which a current usage score is to be calculated.

Figure 3B:
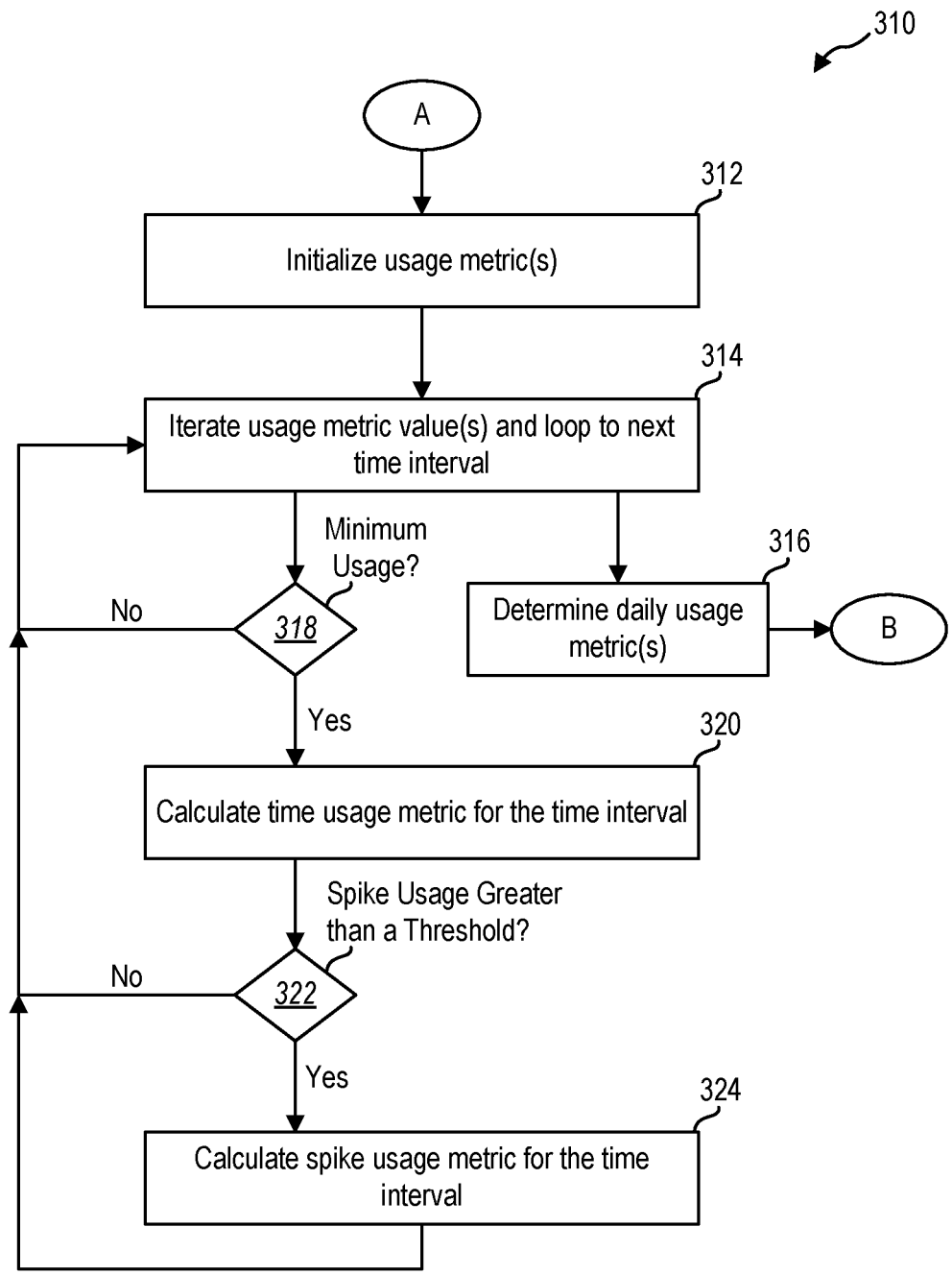
FIG. 3B illustrates an example series of acts related to analyzing and characterizing usage data for a virtual device in accordance with one or more embodiments.

FIG. 3B illustrates an example series of acts 310 for determining various usage metrics over time. For example, as shown in FIG. 3B, the virtual service upgrade system 106 may perform an act 312 of initializing a usage metric for a predetermined period of time. In the example where a daily usage summary is provided, the virtual service upgrade system 106 may initialize usage metrics to zero and proceed to analyze usage data for a plurality of time intervals.

As shown in FIG. 3B, the series of acts 310 may include an act 314 of iterating usage metric value(s) and looping to a next interval. For example, the virtual service upgrade system 106 may loop or otherwise proceed to analyzing data for a first interval (e.g., after initializing the usage metrics to zero). As another example, the virtual service upgrade system 106 may loop from a first interval to a second interval. The virtual service upgrade system 106 may iterate any number of intervals included within a predetermined period of time corresponding to a usage summary. In one or more embodiments, the virtual service upgrade system 106 may iterate through each interval of a predetermined period of time over which the usage score is calculated for a virtual device.

As shown in FIG. 3B, the virtual service upgrade system 106 may perform an act 316 of determining a daily usage metric. In particular, after iterating through a plurality of intervals that make up a daily period (or other predetermined period of time), the virtual service upgrade system 106 may determine a set of daily usage metrics reflective of cloud computing resource consumption over the daily period. This may include a count of intervals that one or more conditions are satisfied, such as a number of intervals in which a non-zero measure of resource usage was observed and/or a number of intervals in which a threshold percentage of cloud computing resources were used by a virtual device.

The virtual service upgrade system 106 may additionally perform a series of acts for each interval prior to determining the daily usage metric(s). For example, as shown in FIG. 3B, the virtual service upgrade system 106 can perform an act 318 of determining whether a virtual device was used a minimum threshold amount for a time interval. Where the virtual device was not used at all or where some minimal amount of resource usage was observed for a relevant time interval, the virtual service upgrade system 106 may return to the act 314 that involves looping to a next interval without performing any additional processing for the time interval.

Conversely, where the usage data for the time interval indicates higher than a minimum threshold of cloud computing resource usage, the virtual service upgrade system 106 can perform an act 320 of calculating the time usage metric for the time interval. In one or more embodiments, this may involve determining a quantity of cloud computing resources for the time interval. In one or more embodiments, this may involve simply identifying that the minimum threshold metric was satisfied for the time interval.

As shown in FIG. 3B, based on observing the minimal resource consumption threshold and determining the time usage metric for the time interval, the virtual service upgrade system 106 can perform an act 322 of determining whether a spike usage threshold is met for the time interval. As noted above, this may involve determining that a threshold percentage of cloud computing resources were consumed over the specific time interval. As an illustrative example, the virtual service upgrade system may determine whether greater than 75% of a cloud computing resource was consumed by a virtual device over the time interval.

Where the virtual device was not used at or above the threshold percentage, the virtual service upgrade system 106 may return to the act 314 that involves looping to a next interval without incrementing a spike metric. In this example, the virtual service upgrade system 106 may update a time usage interval without incrementing the spike metric value. Conversely, where the usage data for the time interval indicates a spike percentage above the threshold percentage, the virtual service upgrade system 106 may perform an act 324 of determining the spike metric for the interval and return to iterating the usage metric values determined for the time interval. In this example, the virtual service upgrade system 106 may update both the time usage metric and spike usage metric for a relevant period of time.

Figure 3C:
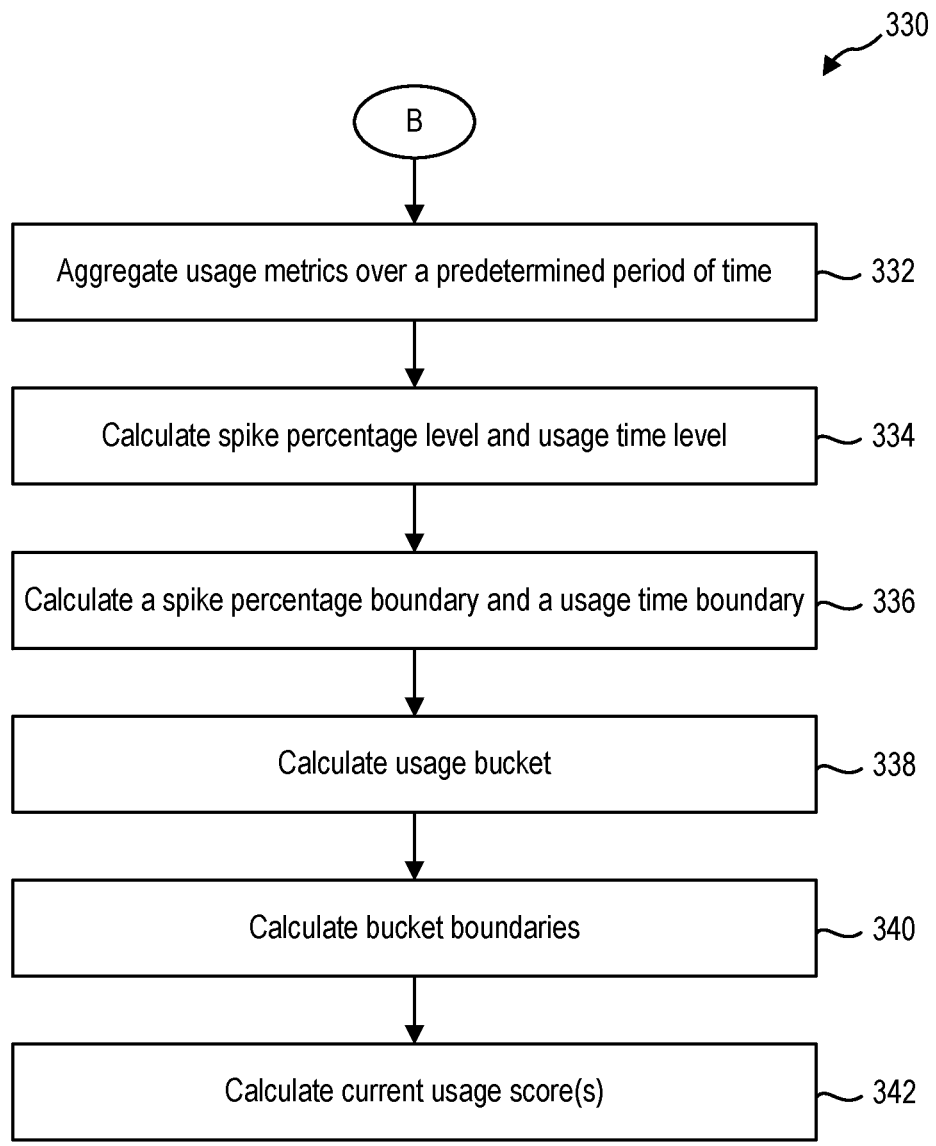
FIG. 3C illustrates an example series of acts related to determining a current usage score for a virtual device in accordance with one or more embodiments.

FIG. 3C illustrates an example series of acts 330 for determining a usage score for a virtual device over a predetermined period of time (e.g., two weeks). In particular, FIG. 3C illustrates an example series of acts 330 that may be performed by the virtual service upgrade system 106 to determine a current usage score based on a combination of spike usage metric(s) and time usage metric(s) determined for time intervals that make up a predetermined period of time of fourteen days. These acts 330 may be performed by the scoring engine 112 of the virtual service upgrade system in accordance with one or more examples discussed above.

As shown in FIG. 3C, the virtual service upgrade system 106 may perform an act 332 of aggregating usage metrics over a predetermined period of time. In one or more embodiments, the virtual service upgrade system accumulates the usage information based on information received for each time interval. In one or more embodiments, the virtual service upgrade system 106 accumulates usage data from daily summaries obtained or otherwise generated over the period of time. The aggregation may be updated at incremental intervals. For example, in one or more embodiments, the virtual service upgrade system 106 updates the aggregated data daily. In one or more embodiments, the virtual service upgrade system 106 updates the aggregated data for each time interval as the usage metrics are updated and received.

Based on the aggregated data, the virtual service upgrade system 106 may perform a series of acts in accordance with the various calculations described above in connection with the scoring engine. For example, as shown in FIG. 3C, the virtual service upgrade system may perform an act 334 of calculating a spike percentage level and a usage time level. As further shown, the virtual service upgrade system 106 may perform an act 336 of calculating a spike percent boundary and a usage time boundary. As noted above, these boundaries may refer to boundaries of values that make up the usage buckets.

As further shown, the virtual service upgrade system 106 may perform an act 338 of calculating usage buckets for the virtual device (e.g., for the relevant time period) based on the spike percent level and the usage time level. In one or more embodiments, the virtual service upgrade system 106 may perform an act 340 of calculating a bucket boundary. As further shown, and as will be discussed in further detail below in connection with FIG. 5, the virtual service upgrade system 106 may perform an act 342 of calculating a current usage score based on the usage metrics.

In one or more embodiments, the virtual service upgrade system 106 determines a usage score based on a composite of usage metrics determined for a plurality of types of usage data. For example, in one or more embodiments, the usage score is based on usage metrics determined for respective usage data types, such as CPU usage, memory usage, etc. Alternatively, the usage score may be based on a specific type of usage data. In one or more embodiments, the virtual service upgrade system 106 determines a plurality of usage scores for each of the usage data types and determines a combined usage score based on the individually calculated usage scores based on the respective usage data types.

Figure 4:
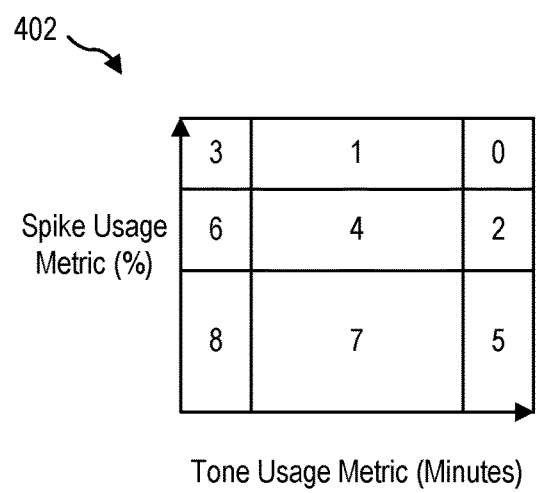
FIG. 4 illustrates an example implementation of usage buckets used by the virtual service upgrade system in accordance with one or more embodiments.

As discussed above, the virtual service upgrade system 106 can assign a virtual device into one of a plurality of usage buckets based on associated usage data tracked over a previous period of time. As an illustrative example, FIG. 4 provides an example illustration of a plurality of usage buckets mapped on a bucket grid 402 with axes corresponding to usage metrics that are determined for the virtual device. In particular, FIG. 4 shows an example bucket grid 402 with an x-axis corresponding to a time usage metric in minutes with a y-axis corresponding to a spike usage metric in percent. As shown in FIG. 4, each of nine regions of the bucket grid 402 may be assigned a bucket value between 0-8. It will be understood that FIG. 4 shows one example implementation of the bucket values corresponding to respective regions of the bucket grid 402. Other implementations may assign different bucket values to different regions. Further, it will be understood that the regions may be uniform in size or, alternatively, may be weighted differently based on any number of factors (e.g., a relative health of the virtual device for specific ranges of usage metrics, percentile values of virtual devices assigned to respective buckets, etc.).

As further shown in FIG. 4, each of the buckets or discrete portions of the bucket grid 402 may be associated with a particular score range, as illustrated in an example bucket score table 404. These score ranges may refer to ranges of usage scores that may be assigned to a virtual device when assigned to a corresponding usage bucket. Similar to the specific orientation and size of the bucket regions within the bucket grid, the ranges of usage scores are provided by example, and may have different ranges depending on various factors. In this example, a higher usage score may correspond to a healthier virtual device that is not operating at or near peak capacity while lower usage scores may correspond to a less healthy virtual device that is operating at or near peak capacity and may be experiencing intermittent interruptions with various applications or services.

Figure 5:
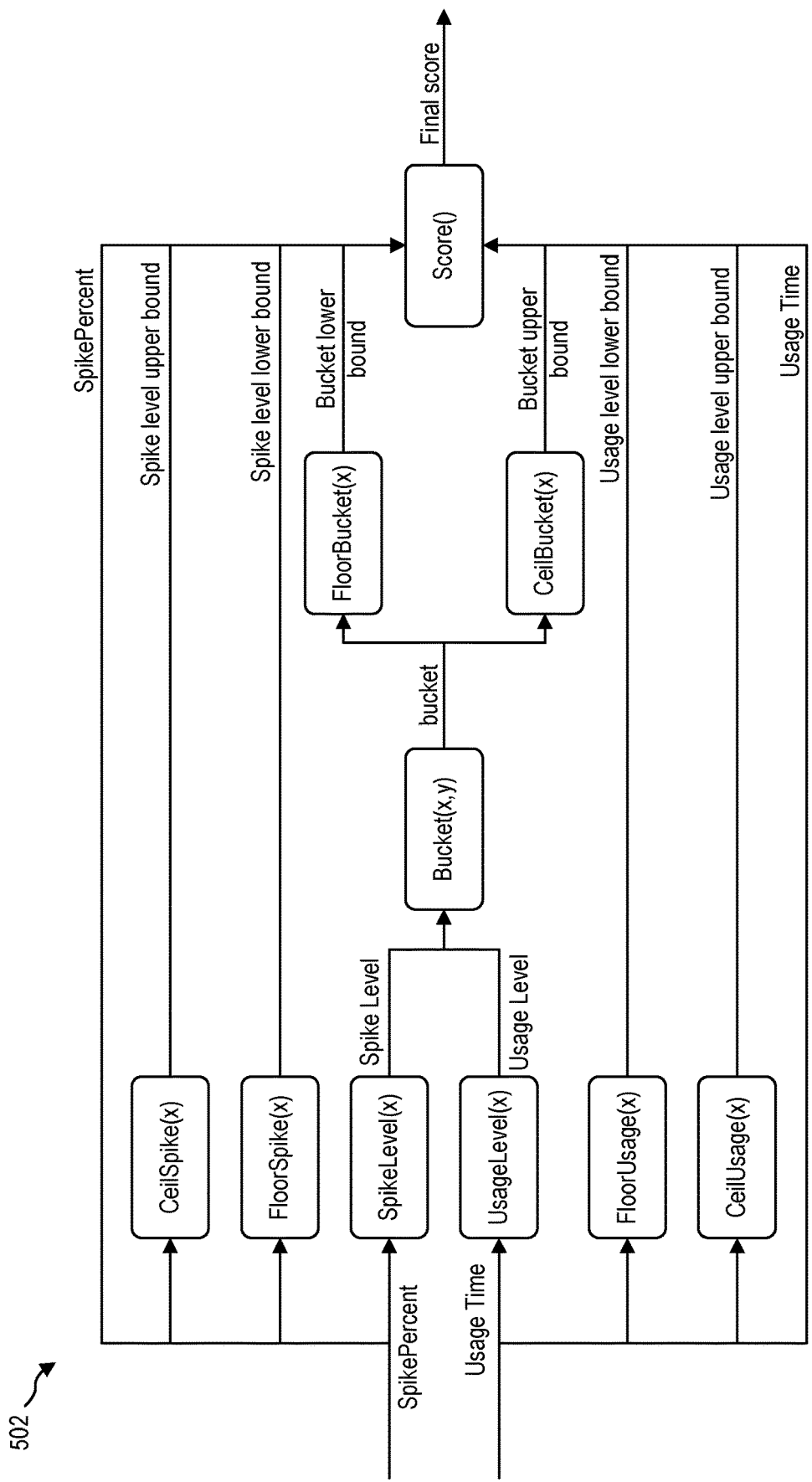
FIG. 5 illustrates an example workflow showing a calculation of a current usage score for a virtual device in accordance with one or more embodiments.

FIG. 5 illustrates an example workflow showing one implementation in which a usage score may be calculated for a virtual device. In particular, FIG. 5 illustrates a series of acts 502 that may be performed to determine specific values and metrics that may be used to determine a usage score for a virtual device over a predetermined period of time. Each of these metrics are discussed in further detail above in connection with example formulas and equations. In particular, as shown in FIG. 5, the virtual service upgrade system may determine a spike ceiling value, a spike floor value, a usage floor value, and a usage ceiling value. The virtual service upgrade system may further determine spike levels and usage levels (e.g., usage metrics) to determine a corresponding usage bucket for the virtual device. Based on the bucket identification, the virtual service upgrade system may determine a floor bucket value and a ceiling bucket value, which may be used to determine a current usage score for the virtual device.

Figure 6:
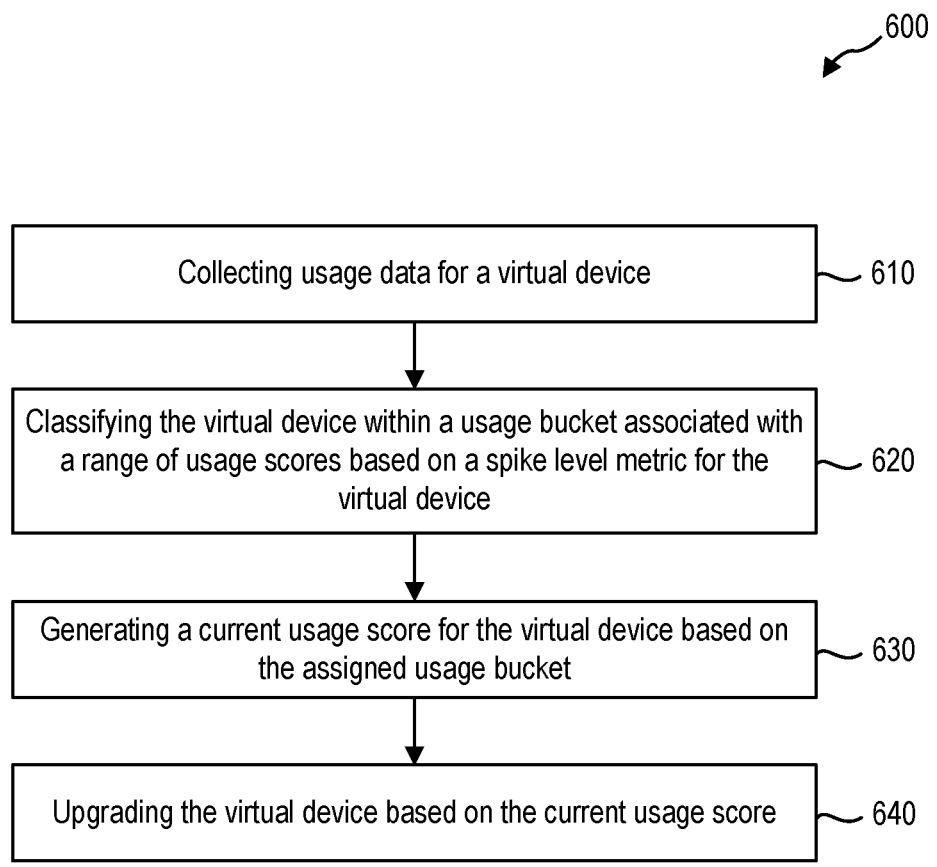
FIG. 6 illustrates an example series of acts for facilitating an upgrade for a virtual device based on a current usage score in accordance with one or more embodiments.

Turning now to FIG. 6, This figure illustrate example flowcharts including series of acts for collecting usage data, evaluating the usage data to determine various usage metrics, and determining a usage score for a virtual machine based on one or more of the usage metrics. While FIG. 6 illustrates acts according to one or more embodiments, alternative embodiments may omit, add to, reorder, and/or modify any of the acts shown in FIG. 6. The acts of FIG. 6 can be performed as part of a method. Alternatively, a non-transitory computer-readable medium can include instructions that, when executed by one or more processors, cause a computing device to perform the acts of FIG. 6. In still further embodiments, a system can perform the acts of FIG. 6.

As shown in FIG. 6, the series of acts 600 may include an act 610 of collecting usage data for a virtual device. For example, in one or more embodiments, the act 610 may involve receiving usage data associated with a virtual device. In one or more embodiments, the usage data is obtained by an agent on the virtual device.

As further shown, the series of acts 600 may include an act 620 of classifying the virtual device within a usage bucket associated with a range of usage scores based on a spike level metric for the virtual device. In one or more embodiments, the act 620 involves determining, based on a number of time intervals that the usage data exceeds a threshold value over a predetermined period of time, a spike level metric of the virtual device. Determining the spike level metric based on number of time intervals can significantly reduce processing expenses as a result of accumulating the data in terms of the number of time intervals, rather than accumulating specific usage data over multiple days or weeks corresponding to the predetermined period of time. Further, in one or more embodiments, the act 620 involves determining, based on the spike level metric, a usage bucket associated with the virtual device, wherein the usage bucket is associated with a range of usage scores. Similar to the concept of determining the spike level metric based on the number of time intervals, determining the usage bucket for the virtual device can similarly enable the systems described herein to save processing expense in determining a usage categorization or classification for the device. Indeed, by classifying the virtual devices in buckets, many virtual devices need not be further analyzed to determine if upgrade and/or downgrade would be necessary or otherwise helpful.

As further shown, the series of acts 600 may include an act 630 of generating a current usage score for the virtual device based on the assigned usage bucket. For example, in one or more embodiments, the act 630 involves determining, based on the spike level metric, a usage bucket associated with the virtual device where the usage bucket is associated with a range of usage scores. Similar to above, generating the current usage score based on the categorization within the usage bucket(s) as well as the usage metric(s) being determined based on numbers of time intervals (rather than more robust usage data) enables the systems herein to determine the usage in a computationally efficient manner.

As further shown, the series of acts 600 may include an act 640 of upgrading the virtual device based on the current usage score. For example, in one or more embodiments, the act 640 involves causing, based on the current usage score being less than a threshold usage score for the predetermined period of time, the virtual device to be upgraded. Upgrading the virtual device in this manner allows for elasticity of resources for a tenant deployment. Further, by selectively identifying virtual devices for upgrade in this manner, the systems described herein can provide upgrades/downgrades in a selective manner that is unique to a particular deployment of devices.

In one or more embodiments, the virtual device is implemented on a server node of a cloud computing system and associated with a user of the cloud computing system. In one or more embodiments, the virtual device is associated with a first device type having a first quantity of compute resources and a first quantity of memory resources. In one or more implementations, causing the virtual device to be upgraded includes upgrading the virtual device from the first device type to a second device type having a second quantity of compute resources and a second quantity of memory resources. In one or more embodiments, causing the virtual device to be upgraded includes increasing a quantity of compute resources of the virtual device and/or increasing a quantity of memory resources of the virtual device. Moreover, in one or more embodiments, causing the virtual device to be upgraded includes migrating data of the virtual device from a first server node to a second server node where the second server node has greater availability of memory capacity or compute capacity than the first server node. As discussed above, facilitating an upgrade by way of upgrading from a first device type to a second device type, increasing computing resources, or simply migrating data from one node to another provides significant computing elasticity and provides efficient utilization of computing resources for a tenant deployment.

In one or more embodiments, determining the usage bucket associated with the virtual device includes comparing the spike level metric to a plurality of thresholds associated with different usage buckets. Determining the usage bucket may further include determining, based on comparing the spike level metric to the plurality of thresholds, the usage bucket. In one or more embodiments, the usage bucket is associated with a range of usage scores where generating the current usage score is based on a percentage of time over the predetermined period of time that the spike level metric exceeds at least one threshold of the plurality of thresholds. As noted above, determining the usage buckets and utilizing the usage buckets to determine a current usage score provides a computationally efficient manner to determine usage score.

In one or more embodiments, the series of acts 600 includes determining a time usage metric of the virtual device based on a second number of time intervals that the usage data associated with the virtual device indicates that the virtual device was used over the predetermined period of time. As discussed herein, by determining a second number of time intervals associated with the virtual being used over the predetermined period of time, the current usage score can be determined for a selective subset of virtual devices. In one or more implementations, determining the usage bucket is further based on the time usage metric of the virtual device. Moreover, in one or more embodiments, determining the usage bucket includes mapping the number of time intervals to a first coordinate on a grid space, mapping the second number of time intervals to a second coordinate on the grid space, and identifying the usage bucket based on a region of the grid space corresponding to the first coordinate and the second coordinate. Similar to one or more embodiments described above, determining the current usage score based on the usage bucket provides a computationally efficient approach to classifying usage for the virtual device.

In one or more embodiments, the series of acts 600 includes performing a set of acts for each time interval over the predetermined period of time. For example, the series of acts 600 may include determining whether the usage data indicates that the virtual device was used during a time interval. Further, the series of acts 600 may include determining whether the usage data exceeds the threshold value over the time interval. Determining whether the usage data exceeds the threshold value may include analyzing the usage data to determine whether the usage data exceeds the threshold value for the time interval if the usage data indicates that the virtual machine was used (e.g., a non-zero or higher than a minimum threshold amount) during the time interval. Determining whether the usage data exceeds the threshold value may further involve inferring that the usage data does not exceed the threshold value without further analysis of the usage data where the usage data does not indicate that the virtual machine was used during the time interval. As noted above, by comparing the usage data to the threshold values, the method enables selective analysis of a subset of virtual devices in a way that saves significant processing expense in identifying which of the virtual devices for a deployment should be considered for upgrade (or downgrade).

In one or more embodiments, the usage data includes at least one of telemetry for one or more central processing units (CPUs) associated with the virtual device, telemetry for memory associated with the virtual device and/or telemetry for I/O activity associated with the virtual device. In one or more embodiments, the virtual device is one of a plurality of virtual machines associated with a tenant of a cloud computing system. Further, in one or more embodiments, the series of acts 600 may include providing an upgrade interface for an administrative user associated with an account of the virtual device where the upgrade interface includes a selectable option associated with upgrading the virtual device. The selectable option being presented may be based on the current usage score being less than the threshold usage score for the predetermined period of time. Presenting the upgrade interface as discussed herein enables a user to easily view which of the virtual devices have current scores that may need further review prior to determining whether to upgrade or downgrade the machines. In accordance with implementations described herein, this enables an administrator of a deployment to view a small fraction of devices that are being under or over utilized for a deployment rather than parsing a collection of scores for hundreds or thousands of virtual devices of a given deployment.

Figure 7:
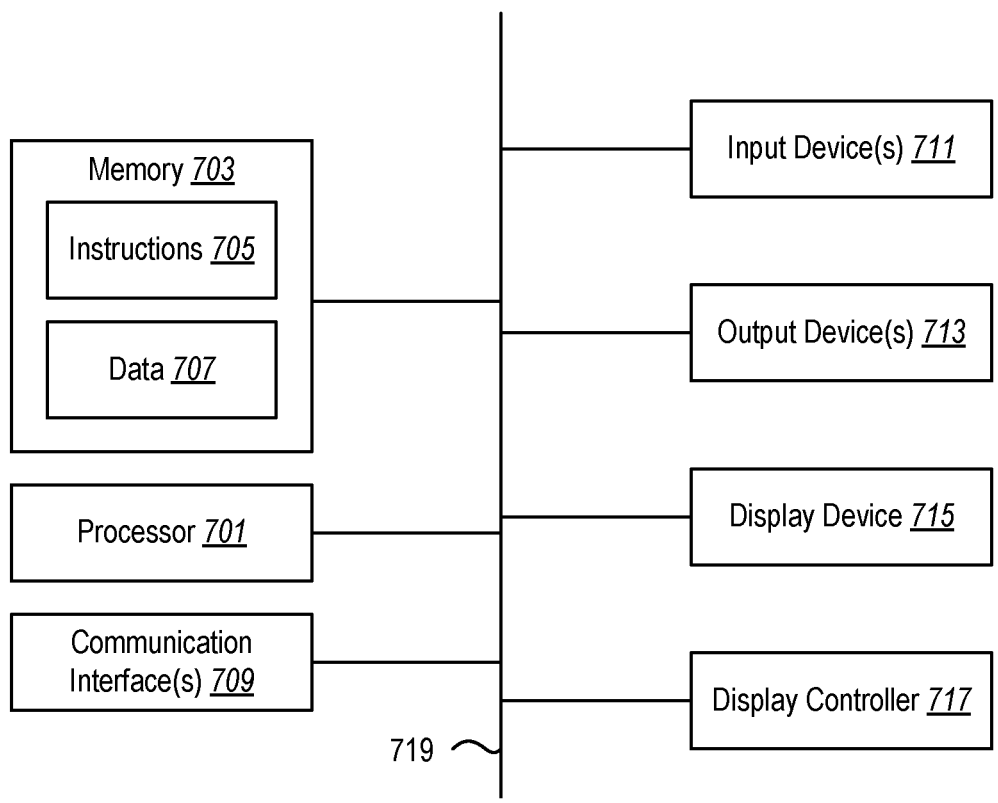
FIG. 7 illustrates certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computer-implemented method, comprising:
receiving usage data indicating utilization of one or more cloud computing resources by a virtual device;
determining, based on a number of time intervals that the usage data exceeds a threshold value over a predetermined period of time, a spike level metric of the virtual device;
determining, based on the spike level metric, a usage bucket associated with the virtual device, wherein the usage bucket is associated with a range of usage scores;
generating, based on the virtual device being associated with the usage bucket, a current usage score of the virtual device; and
causing, based on the current usage score being less than a threshold usage score for the predetermined period of time, the virtual device to be upgraded, wherein causing the virtual device to be upgraded includes migrating data of the virtual device from a first server node to a second server node, the second server node having greater availability of memory capacity or compute capacity than the first server node.

2. The computer-implemented method of claim 1, wherein the virtual device is associated with a user of a cloud computing system.

3. The computer-implemented method of claim 1, wherein the virtual device is associated with a first device type having a first quantity of compute resources and a first quantity of memory resources.

4. The computer-implemented method of claim 3, wherein causing the virtual device to be upgraded further includes upgrading the virtual device from the first device type to a second device type having a second quantity of compute resources and a second quantity of memory resources.

5. The computer-implemented method of claim 3, wherein migrating data of the virtual device from the first server node to the second server node results in at least one of:
increasing a quantity of compute resources of the virtual device;
increasing a quantity of memory resources of the virtual device; or
increasing quantities of compute resources and memory resources of the virtual device.

6. The computer-implemented method of claim 1, wherein determining the usage bucket associated with the virtual device includes:
comparing the spike level metric to a plurality of thresholds associated with different usage buckets; and
determining, based on comparing the spike level metric to the plurality of thresholds, the usage bucket associated with the virtual device.

7. The computer-implemented method of claim 6, wherein the usage bucket is associated with a range of usage scores, and wherein generating the current usage score is based on a percentage of time over the predetermined period of time that the spike level metric exceeds at least one threshold of the plurality of thresholds.

8. The computer-implemented method of claim 1, further comprising:
determining a time usage metric of the virtual device based on a second number of time intervals that the usage data associated with the virtual device indicates that the virtual device was used over the predetermined period of time; and
wherein determining the usage bucket is further based on the time usage metric of the virtual device.

9. The computer-implemented method of claim 8, wherein determining the usage bucket includes:
mapping the number of time intervals to a first coordinate on a grid space;
mapping the second number of time intervals to a second coordinate on the grid space; and
identifying the usage bucket based on a region of the grid space corresponding to the first coordinate and the second coordinate.

10. The computer-implemented method of claim 1, further comprising, for each time interval over the predetermined period of time:
determining whether the usage data indicates that the virtual device was used during a time interval; and
determining whether the usage data exceeds the threshold value over the time interval, wherein determining whether the usage data exceeds the threshold value comprises:
if the usage data indicates that the virtual device was used during the time interval, analyzing the usage data to determine whether the usage data exceeds the threshold value for the time interval; and
if the usage data does not indicate that the virtual device was used during the time interval, inferring that the usage data does not exceed the threshold value without further analysis of the usage data.

11. The computer-implemented method of claim 1, wherein the usage data includes at least one of:
telemetry for at least one central processing units (CPUs) associated with the virtual device;
telemetry for memory associated with the virtual device; or
telemetry for input/output (I/O) activity associated with the virtual device.

12. The computer-implemented method of claim 1, wherein the virtual device is one of a plurality of virtual machines associated with a tenant of a cloud computing system.

13. The computer-implemented method of claim 1, further comprising providing an upgrade interface for an administrative user associated with an account of the virtual device, wherein the upgrade interface includes a selectable option associated with upgrading the virtual device, the selectable option being presented based on the current usage score being less than the threshold usage score for the predetermined period of time.

14. A system, comprising:
at least one processor;
memory in electronic communication with the at least one processor; and
instructions stored in the memory, the instructions being executable by the at least one processor to:
receive usage data indicating utilization of one or more cloud computing resources by a virtual device;
determine, based on a number of time intervals that the usage data exceeds a threshold value over a predetermined period of time, a spike level metric of the virtual device;
determine, based on the spike level metric, a usage bucket associated with the virtual device, wherein the usage bucket is associated with a range of usage scores;
generate, based on the virtual device being associated with the usage bucket, a current usage score of the virtual device; and
cause, based on the current usage score being less than a threshold usage score for the predetermined period of time, the virtual device to be upgraded, wherein causing the virtual device to be upgraded includes migrating data of the virtual device from a first server node to a second server node, the second server node having greater availability of memory capacity or compute capacity than the first server node.

15. The system of claim 14, wherein the virtual device is associated with a first device type having a first quantity of compute resources and a first quantity of memory resources, and wherein migrating data of the virtual device from the first server node to the second server node results in at least one of:
increasing a quantity of compute resources of the virtual device;
increasing a quantity of memory resources of the virtual device; or
increasing quantities of compute resources and memory resources of the virtual device.

16. The system of claim 14, wherein determining the usage bucket associated with the virtual device includes:
comparing the spike level metric to a plurality of thresholds associated with different usage buckets, wherein the usage bucket is associated with a range of usage scores; and
determining, based on comparing the spike level metric to the plurality of thresholds, the usage bucket associated with the virtual device, wherein generating the current usage score is based on a percentage of time over the predetermined period of time that the spike level metric exceeds at least one threshold of the plurality of thresholds.

17. The system of claim 14, further comprising instructions being executable by the at least one processor to:
    determine a time usage metric of the virtual device based on a second number of time intervals that the usage data associated with the virtual device indicates that the virtual device was used over the predetermined period of time; and
    wherein determining the usage bucket is further based on the time usage metric of the virtual device.

18. A method, comprising:
    receiving usage data indicating utilization of one or more cloud computing resources by a virtual device;
    determining, based on a first number of time intervals that the usage data exceeds a minimum threshold value over a predetermined period of time, a time usage metric of the virtual device indicating that the virtual device was used over the predetermined period of time;
    determining, based on a second number of time intervals that the usage data exceeds a maximum threshold value over a predetermined period of time, a spike level metric of the virtual device;
    determining, based on the time usage metric and the spike level metric, a usage bucket associated with the virtual device, wherein the usage bucket is associated with a range of usage scores;
    generating, based on the virtual device being associated with the usage bucket, a current usage score of the virtual device; and
    causing, based on the virtual device being associated with the usage bucket, the virtual device to be upgraded, wherein causing the virtual device to be upgraded includes migrating data of the virtual device from a first server node to a second server node, the second server node having greater availability of memory capacity or compute capacity than the first server node.

19. The method of claim 18, wherein migrating data of the virtual device from the first server node to the second server node results in at least one of:
    increasing a quantity of compute resources of the virtual device;
    increasing a quantity of memory resources of the virtual device; or
    increasing quantities of compute resources and memory resources of the virtual device.

20. The method of claim 19, wherein causing the virtual device to be upgraded further includes upgrading the virtual device from a first device type with a first quantity of compute resources and memory resources to a second device type having a second quantity of compute resources and memory resources.

\* \* \* \* \*